(12) United States Patent
Peet et al.

(10) Patent No.: US 8,631,563 B2
(45) Date of Patent: Jan. 21, 2014

(54) APPARATUS AND METHOD FOR REMOVING A DRY TUBE ASSEMBLY FROM A NUCLEAR REACTOR PRESSURE VESSEL

(75) Inventors: C. Alan Peet, Watha, NC (US); James E. Burner, Downington, PA (US); Edward L. Chaney, Watha, NC (US); William L. Goldsworth, Southport, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 842 days.

(21) Appl. No.: 12/423,661

(22) Filed: Apr. 14, 2009

(65) Prior Publication Data

US 2010/0257716 A1    Oct. 14, 2010

(51) Int. Cl.
*B23P 19/04* (2006.01)

(52) U.S. Cl.
USPC ............ 29/723; 29/244; 29/283.5; 29/426.4; 29/426.6

(58) Field of Classification Search
USPC ............... 209/426.1, 723, 0.4–0.6; 29/426.1, 29/0.4–0.6, 723, 244, 268, 283.5
See application file for complete search history.

(56) References Cited

U.S. PATENT DOCUMENTS

| | | | | |
|---|---|---|---|---|
| 1,804,843 | A * | 5/1931 | Santiago | 29/262 |
| 2,690,613 | A * | 10/1954 | Bishop | 29/263 |
| 3,986,245 | A * | 10/1976 | Savor et al. | 29/890.031 |
| 4,077,103 | A * | 3/1978 | Kelley | 29/259 |
| 4,283,826 | A * | 8/1981 | Miller | 29/252 |
| 4,313,793 | A | 2/1982 | Klumb et al. | |
| 4,318,776 | A | 3/1982 | Proill et al. | |
| 4,639,998 | A * | 2/1987 | Shallenberger et al. | 29/426.5 |
| 4,790,976 | A | 12/1988 | Zahn et al. | |
| 4,818,471 | A | 4/1989 | Thomson et al. | |
| 4,832,522 | A | 5/1989 | Thayer et al. | |
| 5,037,603 | A * | 8/1991 | Wood et al. | 376/260 |
| 5,186,437 | A * | 2/1993 | Scott | 254/30 |
| 5,792,829 | A | 8/1998 | Allen et al. | |
| 5,802,127 | A | 9/1998 | Goldberg | |
| 5,852,642 | A | 12/1998 | Descot et al. | |
| 6,398,186 | B1 * | 6/2002 | Lemoine | 254/1 |
| 6,978,983 | B1 * | 12/2005 | Sclease et al. | 254/30 |
| 7,297,908 | B2 * | 11/2007 | Yoshida et al. | 219/635 |
| 2002/0133928 | A1 * | 9/2002 | Scott et al. | 29/426.4 |

FOREIGN PATENT DOCUMENTS

| | | |
|---|---|---|
| JP | 5-027086 A | 2/1993 |
| JP | 11-133179 A | 5/1999 |
| JP | 2000-065981 A | 3/2000 |
| JP | 2005-010117 A | 1/2005 |

OTHER PUBLICATIONS

Search Report issued in connection with European Patent Application No. 10159633.6, Apr. 24, 2012.

* cited by examiner

*Primary Examiner* — Alexander P Taousakis
(74) *Attorney, Agent, or Firm* — Parks IP Law LLC; Stephen J. Terrell

(57) ABSTRACT

An apparatus for removing a dry tube assembly includes a mounting structure configured to mount the apparatus to a top guide of a reactor vessel, a clamping assembly configured to engage the dry tube assembly, and a positioning assembly that is configured to position and rotate the clamping assembly relative to the dry tube assembly. The dry tube assembly is buckled and removed without exercising a joint.

20 Claims, 8 Drawing Sheets

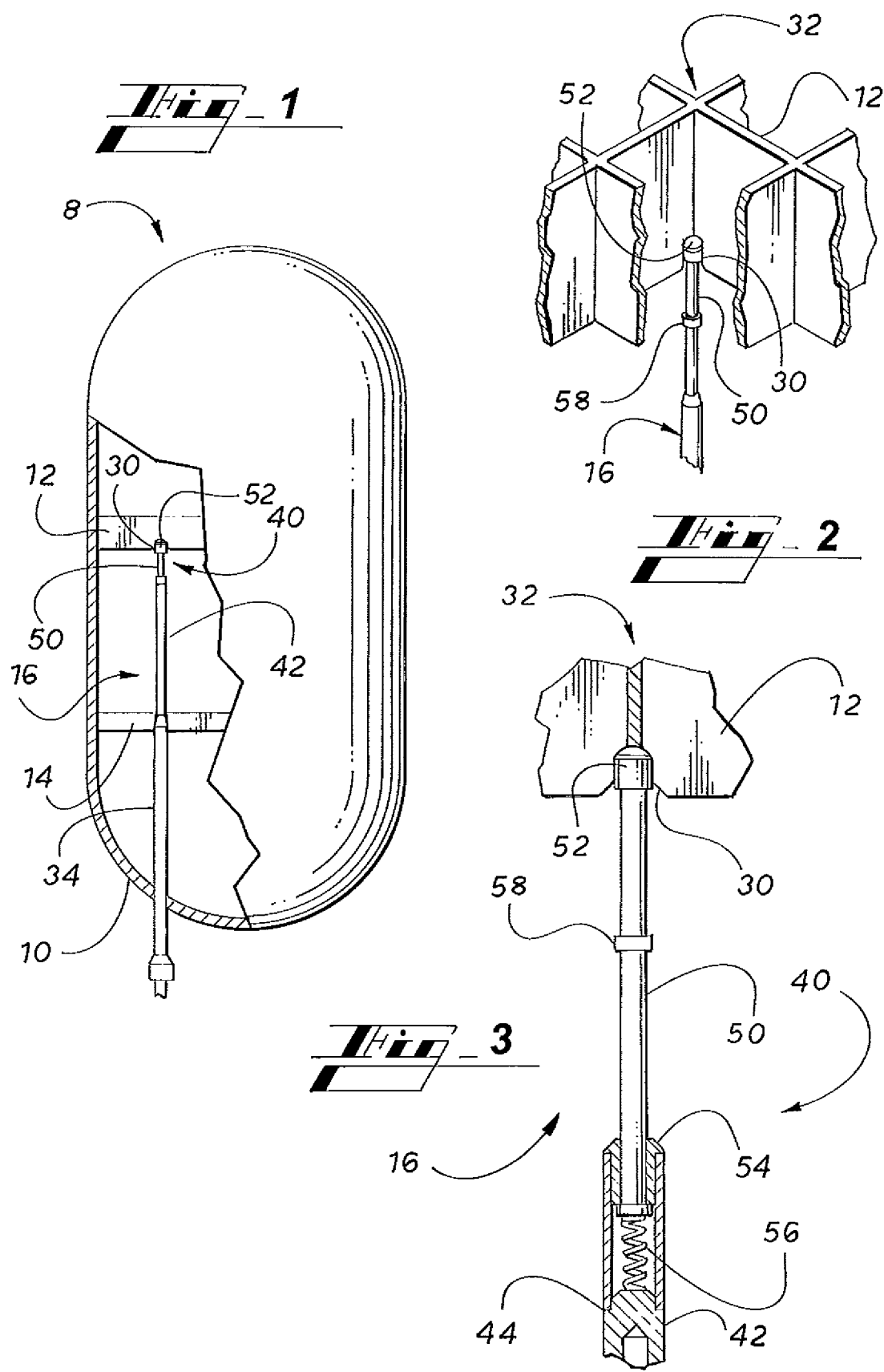

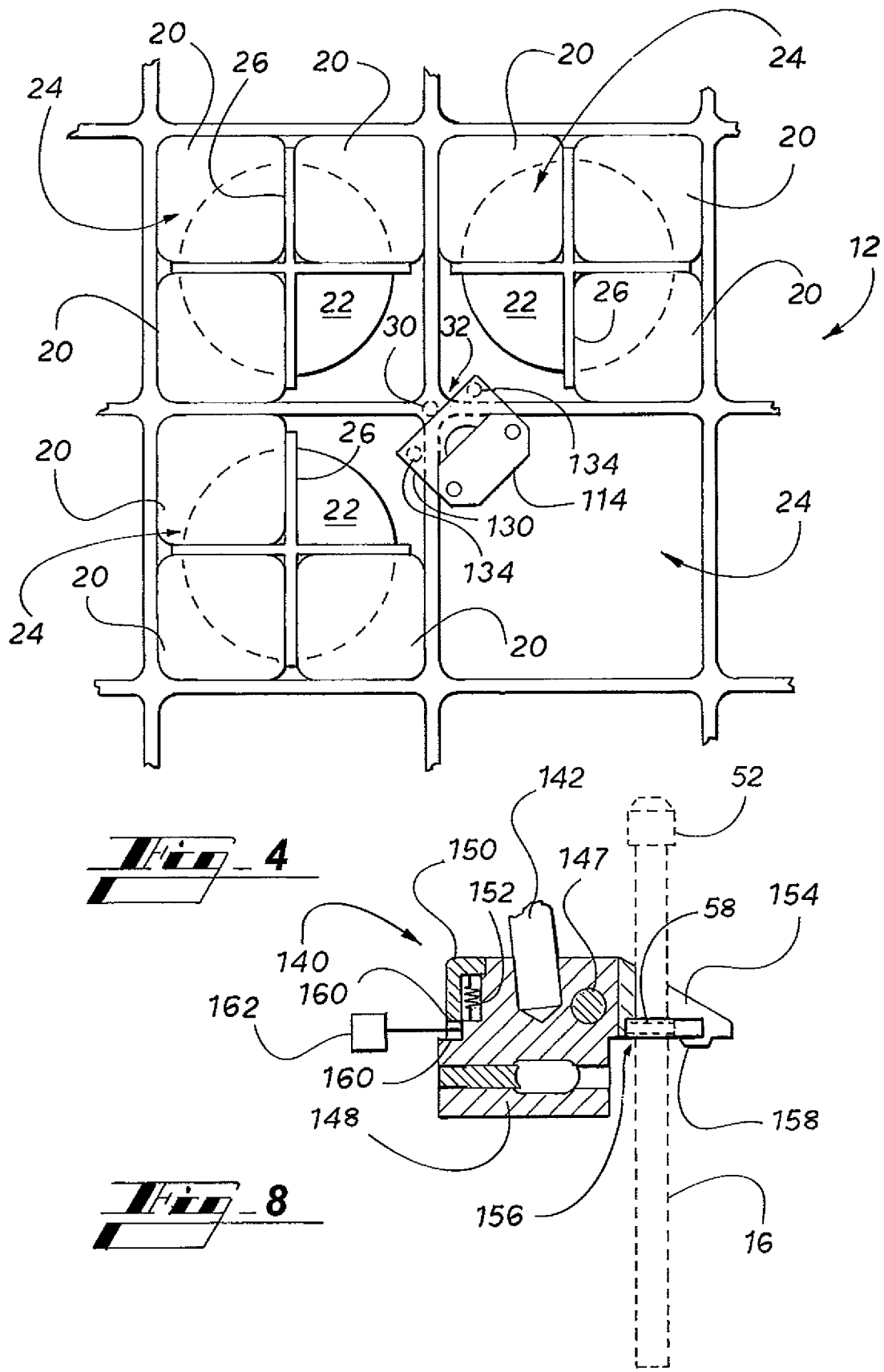

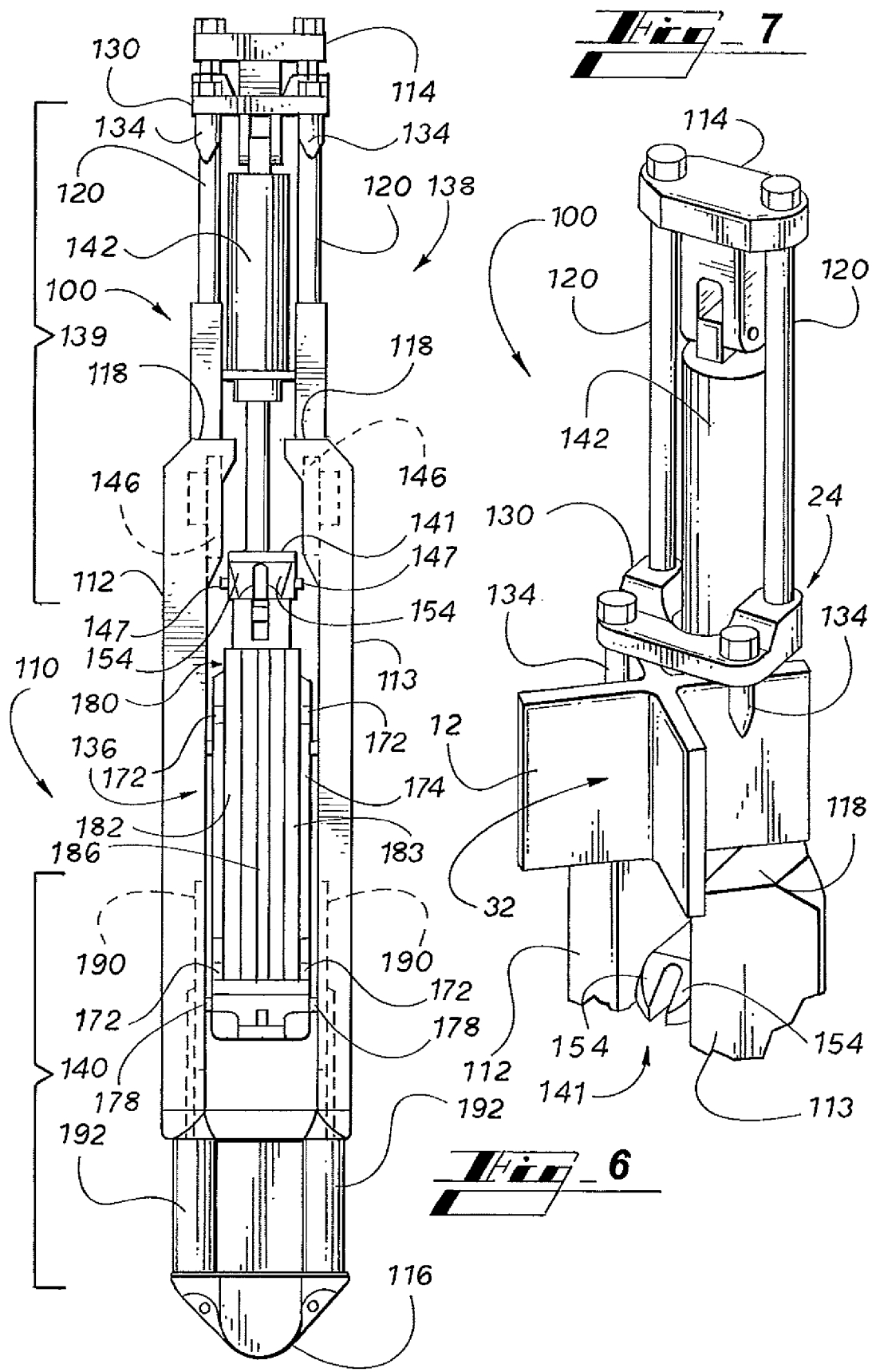

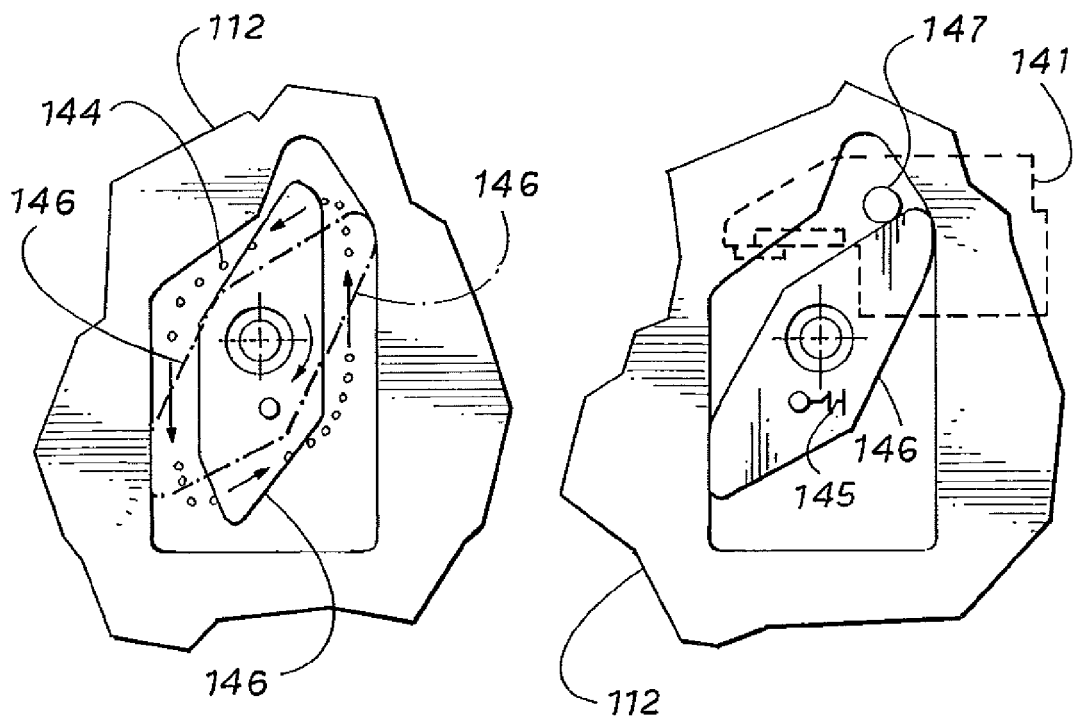
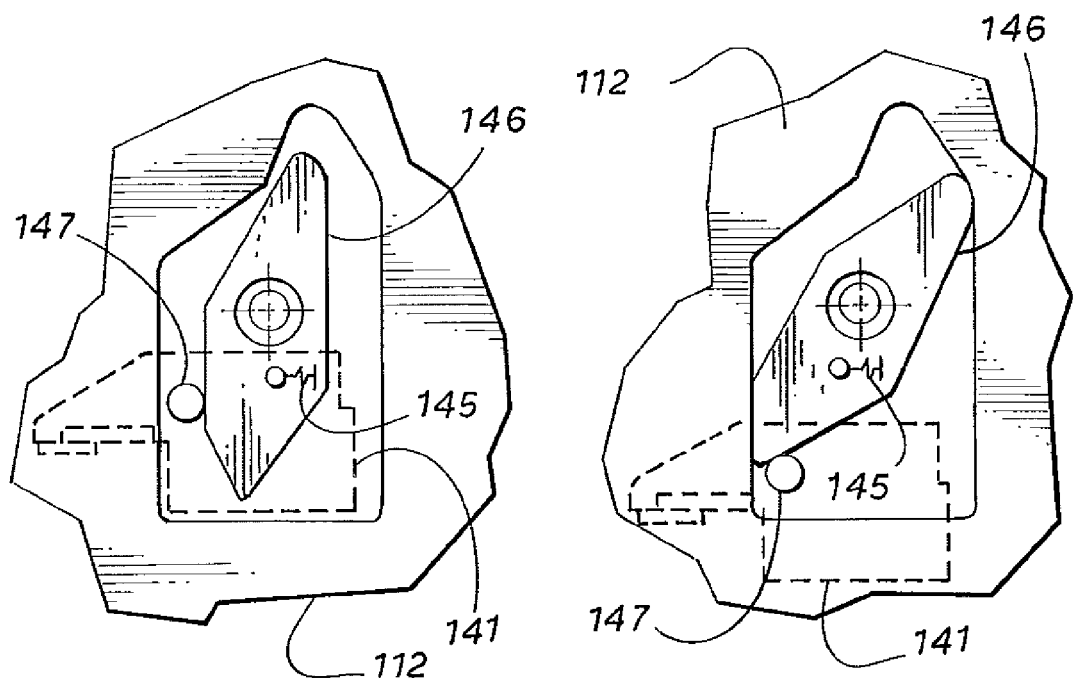

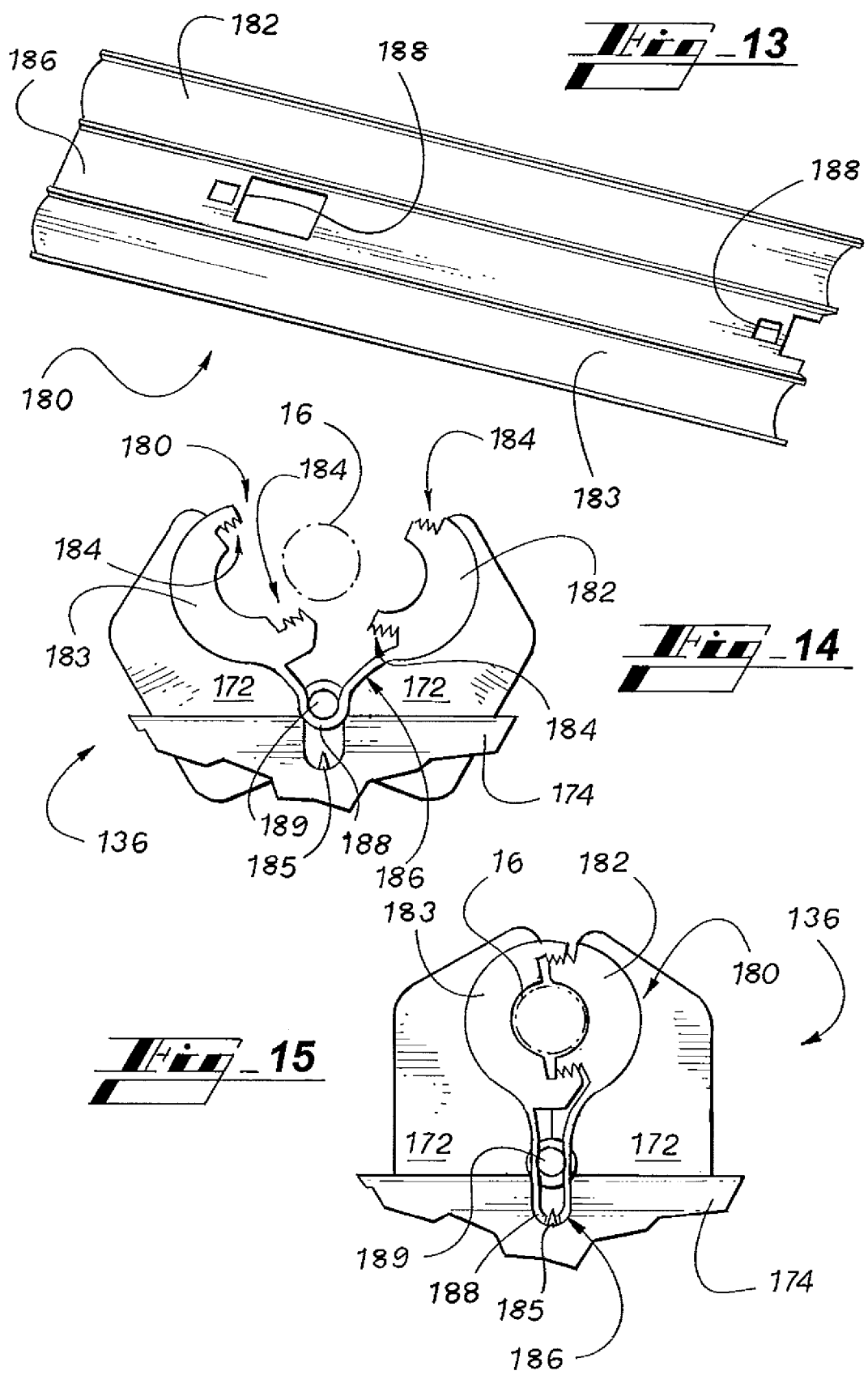

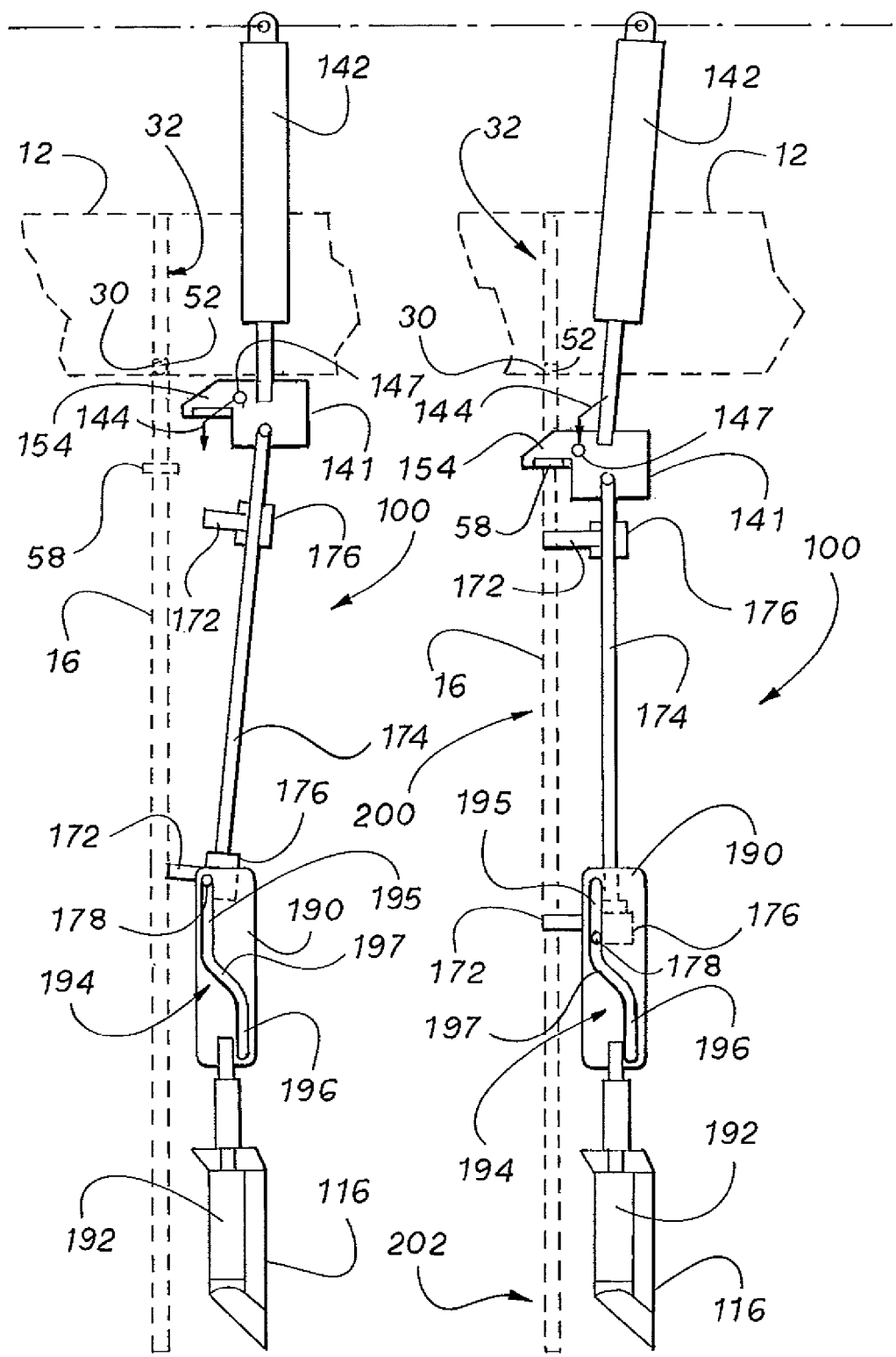

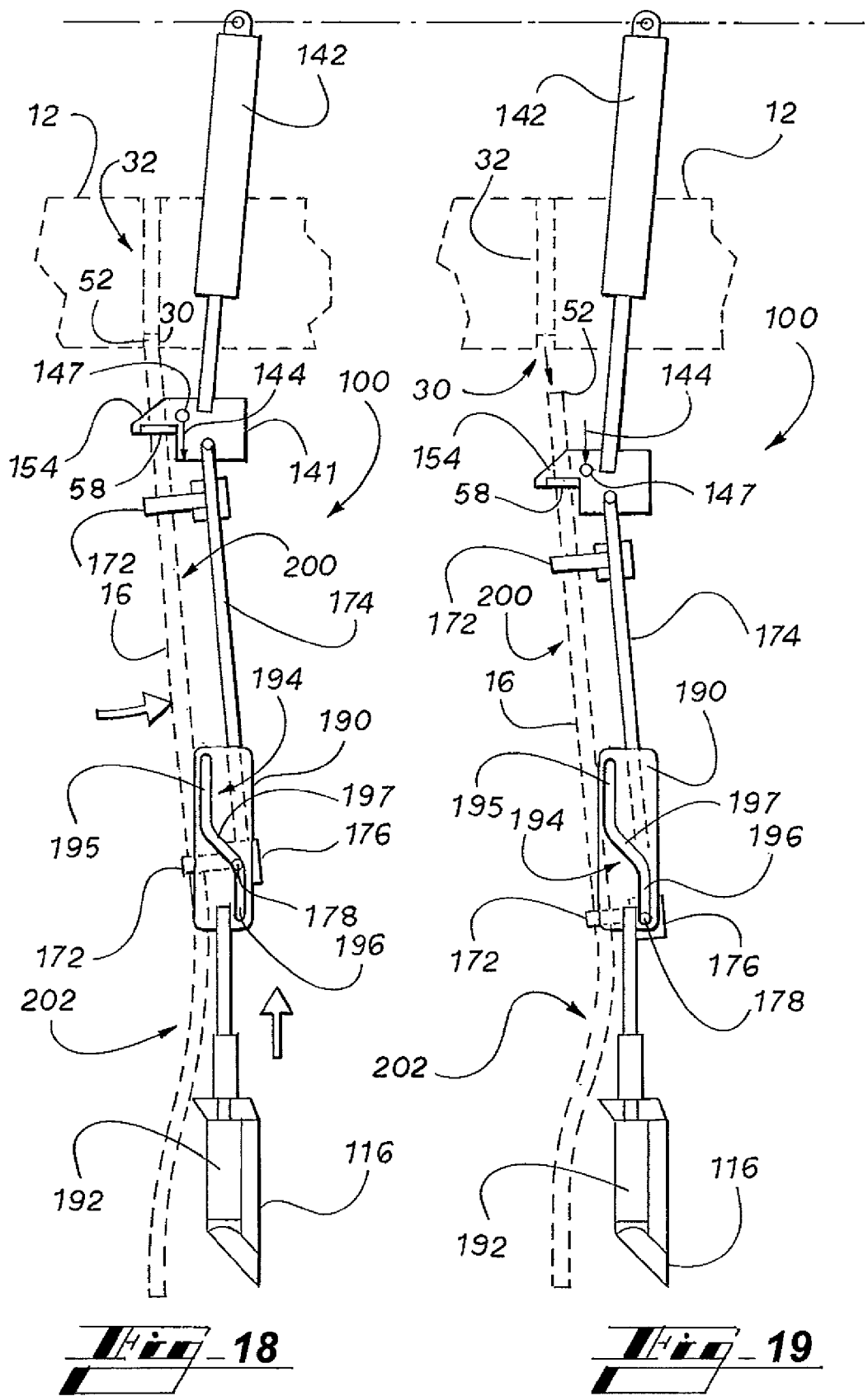

APPARATUS AND METHOD FOR REMOVING A DRY TUBE ASSEMBLY FROM A NUCLEAR REACTOR PRESSURE VESSEL

TECHNICAL FIELD

This disclosure relates generally to apparatuses and methods for servicing nuclear reactor pressure vessels.

BACKGROUND

A boiling water reactor (BWR) includes dry tubes that provide a housing within the reactor vessel that positions sensors, such as nuclear flux detectors and protects them from reactor operating pressure, water, and steam. The dry tubes extend from the bottom of the reactor vessel to just below an upper core support grid, and a spring loaded plunger assembly is attached to the upper end of each dry tube to engage the dry tube with an anchor point in the bottom of the upper support grid.

The dry tube may need to be removed and replaced, for example, as sensors in the dry tube stop working. As the dry tube is deployed or installed in the reactor vessel, a welded joint between the spring loaded plunger assembly and the dry tube can become corroded and the plunger assembly can fail to operate properly. As such, the dry tube becomes stuck and difficult to remove and replace. In such instances, attempting to remove the dry tube by operating the plunger assembly can cause the corroded joint to fail and very undesirably cause debris to fall into the reactor.

Therefore, a heretofore unaddressed need exists in the industry to address the aforementioned deficiencies and inadequacies. What is needed is an apparatus and method for safely and efficiently removing a dry tube.

SUMMARY

The various embodiments of the present disclosure overcome the shortcomings of the prior art by providing a dry tube removal apparatus that is configured to buckle a dry tube assembly to facilitate removal of the dry tube assembly from an operating position in a reactor vessel. In general, an apparatus for removing a dry tube assembly in a reactor vessel includes a clamping assembly configured to engage a dry tube assembly and a positioning assembly that is configured to rotate the clamping assembly. In general, a method for removing a dry tube assembly includes engaging the dry tube assembly with a clamping assembly, rotating the clamping assembly to initiate buckling of the dry tube assembly, and moving the clamping assembly downward to continue to buckle the dry tube assembly and to remove the upper end of the dry tube assembly from a top guide.

According to a first exemplary embodiment, an apparatus includes a mounting structure configured to mount the assembly to a top guide of a reactor vessel, a clamping assembly configured to engage a dry tube assembly, and a positioning assembly that is configured to position and move the clamping assembly. Once the apparatus is mounted to the top guide, the positioning assembly is operated to move the clamping assembly into position to engage the dry tube assembly, and the clamping assembly is operated to engage the dry tube assembly and support a length of the dry tube assembly that includes a joint that connects the plunger assembly and the dry tube. The positioning assembly is then operated to move the clamping assembly so as to initiate buckling along an unsupported length of the dry tube assembly. Once buckling is initiated, the upper end of the dry tube assembly can be removed from engagement with the top guide without operating the plunger assembly or otherwise stressing the joint.

An exemplary mounting structure is configured to mount to a range of top guide depths. The mounting structure includes a slide that is slidably attached to a frame of the apparatus. The slide is received in the support grid of the top guide and against the top of the top guide. The frame is hoisted to bring the frame into contact with the bottom of the top guide while the slide remains in contact with the top guide such that top guide is clamped between the slide and the frame. As such, the apparatus is secured in an operating position. In alternative embodiments, a mounting structure that clamps to the top guide can be actuated by a cylinder or other motorized mechanism.

An exemplary positioning assembly includes and upper positioning assembly and a lower positioning assembly. The exemplary upper positioning assembly includes a presser foot that is driven along a path by a presser foot cylinder. The path is defined by a ratcheting cam that controls the direction of movement of the presser foot as the presser foot cylinder moves the presser foot. The upper end of the clamping assembly is hingedly connected to the presser foot and is positioned along with the presser foot. The lower positioning assembly includes a structure that includes a cam track, a buckling cylinder that displaces the cam track structure, and a cam track follower that couples the lower end of the clamping assembly to the lower positioning assembly. The cam track follower can be a protrusion that is received in the cam track. The position and orientation of the clamping assembly is a function of the extension of the presser foot cylinder, the position of the presser foot along the path, and the position of the cam track follower along the cam track. The position of the cam track follower along the cam track is a function of the extension of the buckling cylinder and the position of the presser foot.

According to an exemplary method, to move the clamping assembly into position to engage the dry tube assembly, the presser foot moves along the path until the presser foot contacts a plunger boss or other structure of the dry tube assembly. In various embodiments, the presser foot is configured to receive and engage the plunger boss. For example, the presser foot can include spring-biased fingers that define a pocket for receiving the plunger boss and the pocket can include a lip that engages the plunger boss.

The clamping assembly is then operated to engage the dry tube assembly. According to an exemplary embodiment, the clamping assembly is configured to engage the dry tube above and below the joint connecting the plunger assembly to the dry tube. In this manner, the joint is supported while the dry tube assembly is bent and buckled. In general, the dry tube assembly is bent along a length of the dry tube assembly that is defined between an end of the dry tube assembly and a point where the apparatus engages the dry tube assembly that is closest to the end. In various embodiments, the clamping assembly applies an encapsulation tube to the dry tube assembly to encapsulate and further support the joint.

The exemplary positioning assembly rotates the clamping assembly to initiate buckling of the dry tube assembly as it is engaged by the clamping assembly. For example, the clamping assembly can rotate about an axis that is substantially orthogonal to the longitudinal axis of the dry tube assembly. The buckling cylinders are actuated to move the cam follower along the cam track, which rotates the clamping assembly about the hinged connection to the presser foot. Once the dry tube assembly is bent, the presser foot cylinder is actuated to move the presser foot and the clamping assembly downward to compress and continue to buckle the dry tube assembly and to remove the upper end of the dry tube assembly from engagement with the bottom of the top guide.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a cut-away view of a boiling water reactor pressure vessel and a dry tube assembly, according to a first exemplary embodiment of the present disclosure.

FIG. 2 is a partial perspective view of the dry tube assembly and a top guide of the pressure vessel of FIG. 1.

FIG. 3 is a partial cross-sectional elevation view of the dry tube assembly and a top guide of the pressure vessel of FIG. 1.

FIG. 4 is a partial plan view of the top guide of FIG. 2.

FIG. 6 is a front elevation view of the apparatus of FIG. 5.

FIG. 7 is a partial perspective view of the apparatus of FIG. 5 and the top guide of FIG. 2.

FIG. 8 is a cross-sectional elevation view of a presser foot of the apparatus of FIG. 5.

FIGS. 9-12 are side elevation views of a ratcheting cam of the apparatus of FIG. 5.

FIG. 13 is a perspective view of an encapsulation sleeve for use with the apparatus of FIG. 5.

FIGS. 14 and 15 are plan views of the apparatus of FIG. 5 and the encapsulation sleeve of FIG. 13.

FIGS. 16-19 are partial side elevation views of the apparatus of FIG. 5 that illustrate a method of removing a dry tube assembly from the top guide of FIG. 2.

DETAILED DESCRIPTION

Figure 5:
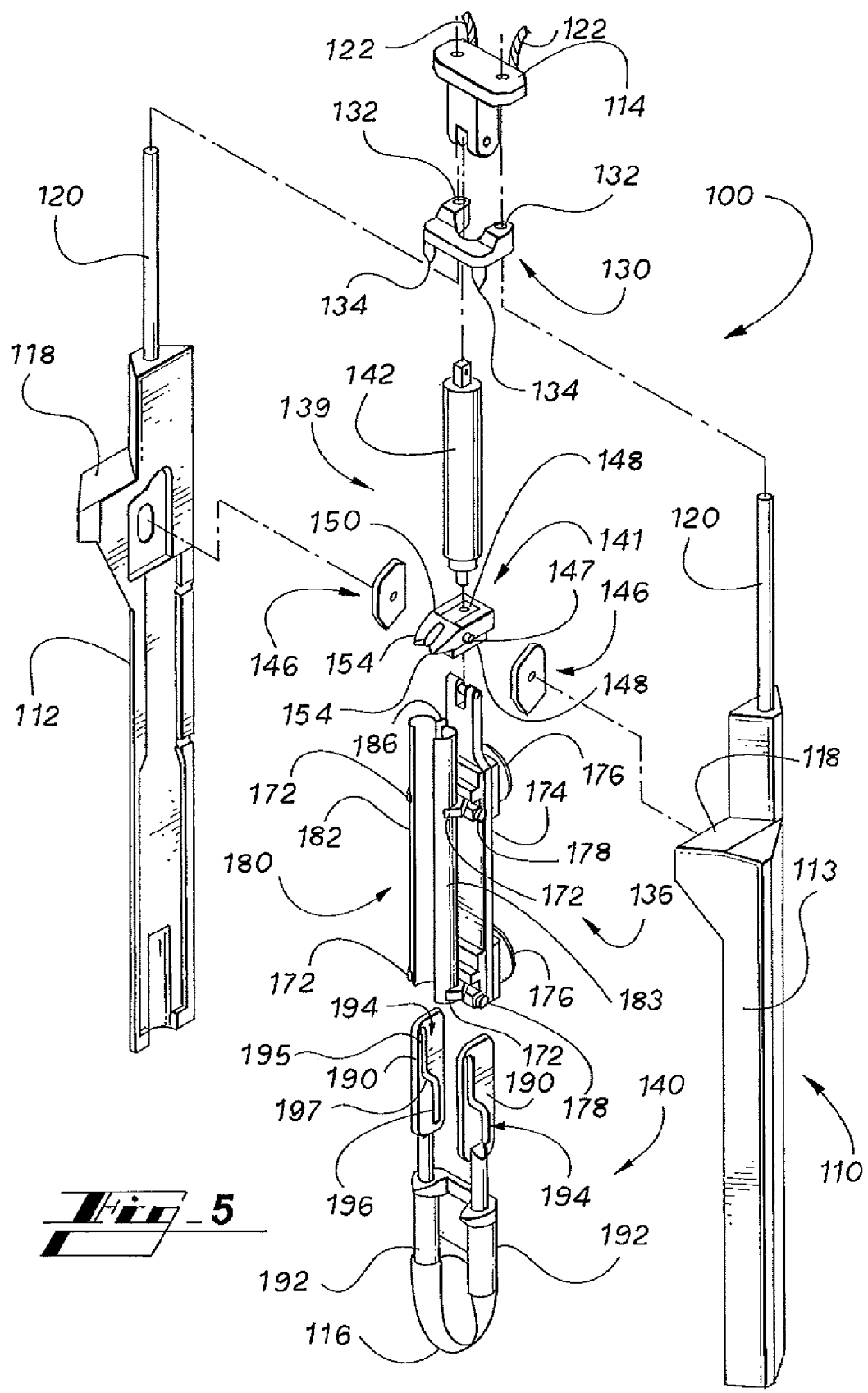
FIG. 5 is an exploded perspective view of an apparatus for removing the dry tube assembly from engagement with the top guide of FIG. 2.

As required, detailed embodiments are disclosed herein. It must be understood that the disclosed embodiments are merely exemplary of the disclosure that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

For purposes of teaching, the present disclosure describes an exemplary apparatus and method for removing a dry tube assembly from deployment in a boiling water reactor (BWR) pressure vessel. The apparatus is configured to buckle the dry tube assembly such that the dry tube assembly can be removed without exercising or stressing a joint that connects a plunger assembly to a dry tube. In alternative embodiments, the apparatus can be configured to work in other environments or to remove other elements according to the teachings of the present disclosure.

Referring to FIG. 1, an exemplary boiling water reactor (BWR) 8 includes a pressure vessel 10 and support structures. The illustrated support structures include a top guide 12 and a bottom guide 14. Generally described, support structures are configured to support elements of the BWR 8. The top guide 12 and the bottom guide 14 each support a dry tube assembly 16. For purposes of clarity, a single dry tube assembly 16 is illustrated although BWRs typically include multiple dry tube assemblies 16 positioned in the pressure vessel 10 as well as fuel bundles, control rods, and other components of a boiling water reactor. Fuel bundles 20 and control rods 22 are illustrated in FIG. 4 and described in further detail below.

Referring to FIGS. 1-4, the illustrated top guide 12 is a support grid that guides fuel bundles 20 as they are raised and lowered with control rods 22. Each control rod 22 supports a group of fuel bundles 20 and raises and lowers the group of fuel bundles 20 through a fuel bundle space 24 in the top guide 12. The fuel bundles 20 within a group are guided by the walls of the fuel bundle space 24 and are partitioned and supported by a control rod blade 26 of the corresponding control rod 22.

A recess 30 is formed at the bottom of the top guide 12 and at an intersection 32 of the support grid of the top guide 12. The recess 30 functions as an anchor point and is configured to receive an upper end of the dry tube assembly 16, as described in further detail below. The bottom guide 14 includes a support tube 34 in which the lower portion of the dry tube assembly 16 is received.

Dry Tube Assembly

As best shown in FIG. 3, the dry tube assembly 16 includes a plunger assembly 40 and a dry tube 42. The illustrated plunger assembly 40 is connected to the illustrated dry tube 42 with a welded joint 44 although other types of joints are within the scope of the disclosure. The illustrated plunger assembly 40 includes a displaceable spring-biased plunger 50 that facilitates securing the position of the dry tube assembly 16 in the pressure vessel 10. The plunger 50 includes an end knob 52 that is configured to be received in the recess 30 to anchor the dry tube assembly 16 in position. The plunger 50 slides within a plunger guide 54 and a compression spring 56 is housed in the plunger guide 54 so as to bias the plunger 50 outwardly. In addition, the plunger 50 includes a boss 58 that facilitates pressing the plunger 50 inwardly. According to the method described in further detail below, the boss 58 can be engaged to facilitate removing the dry tube assembly 16 without pressing the plunger 50 inwardly. Also, the boss 58 provides a reference to facilitate positioning an apparatus to engage the dry tube assembly 16.

In general, dry tubes provide housing for sensors and position the sensors in the core region of the reactor. Various dry tube assemblies that have different sections or lengths, different plunger assemblies, and different configurations for housing different sensors or monitoring systems are within the scope of this disclosure. The apparatus described herein is not limited to operation with the illustrated dry tube assembly but is operable with various dry tube assemblies. Further, in alternative embodiments, the apparatus can be configured for use with other dry tube assemblies according to the teachings of this disclosure.

Referring to FIGS. 1-4, an exemplary and non-limiting method for installing the dry tube assembly is described to provide context. The dry tube assembly 16 is lowered into the open reactor pressure vessel 10 from above, guided through a fuel bundle space 24, and guided through an opening in the bottom guide 14 and into the support tube 34. To secure the dry tube assembly 16 in place, the plunger 50 is pressed inwardly to compress the spring 56 and the dry tube assembly 16 is aligned with the intersection 32 of the top guide 12 where the recess 30 is located. The plunger 50 is then released and extends due to force from the spring 56 such that the end knob 52 is received in the recess 30. As the plunger 50 is forced into the recess 30, the dry tube assembly 16 is secured in an operating position in the pressure vessel 10.

Dry Tube Assembly Removal Apparatus

Referring to FIGS. 5 and 6, an apparatus 100 is configured to remove the dry tube assembly 16 from the operating position in the pressure vessel 10. The dry tube assembly 16 is typically removed and replaced as part of routine maintenance or if it becomes damaged or ceases to operate properly. The apparatus 100 is configured to remove the dry tube assembly 16 without exercising or stressing the joint 44 and without pressing the plunger 50 inwardly to compress the spring 56. As such, the apparatus 100 can remove dry tube assemblies 16 where the joint 44 has become corroded or it is otherwise undesirable to exercise the joint 44. Generally described, the apparatus 100 initiates buckling and buckles the dry tube assembly 16 to remove the upper end of the dry tube assembly 16 from the recess 30 and lifts the dry tube assembly 16 out of the operating position.

Generally described, the dynamic components of the illustrated apparatus are operated by pressure driven cylinders. Fluid or air pressure is transferred from fluid pumps (not shown) to each of the cylinders by pressure hoses (not shown). The fluid pumps are controlled with a control system (not shown). In various embodiments, the control system interfaces with an operator and/or a computer that controls the operation of the apparatus.

Referring to FIG. 5, the apparatus 100 includes a frame 110 that supports, houses, and positions elements of the apparatus 100. The illustrated frame 110 includes two longitudinal arms 112, 113 that are substantially parallel and symmetric to one another. The arms 112, 113 are substantially vertical when the apparatus 100 is mounted to the top guide 12. Upper and lower blocks 114, 116 connect the upper and lower ends of the arms 112, 113 to one another. The arms 112, 113 each include a ledge 118 and a fork 120 that facilitate mounting the apparatus 100 to the top guide 12, as described in further detail below, Hoist cables 122 are attached to the upper block 114 and facilitate positioning the apparatus 100 in the pressure vessel 10 and mounting the apparatus 100 to the top guide 12.

Mounting Mechanism

Referring to FIGS. 4-7, the illustrated apparatus 100 includes a mounting feature that permits the apparatus 100 to be mounted to the illustrated top guide 12 and to top guides of different depths. The illustrated mounting feature includes the ledges 118, the forks 120, and a slide 130. The illustrated forks 120 are integral to the arms 112, 113 and the slide 130 includes apertures 132 that slidably receive the forks 120 such that the slide 130 is able to travel along the length of the forks 120. The illustrated forks 120 permit the slide 130 to move along a length between the upper block 114 and the ledges 118.

The illustrated slide 130 includes a pair of teeth 134 that are configured to be received in fuel bundle spaces 24 of the top guide 12 that are separated by the intersection 32. The teeth-receiving fuel bundle spaces 24 are adjacent to the fuel bundle space 24 where the apparatus 100 is received, as described in further detail below.

The apparatus 100 further includes a clamping assembly 136 and a positioning assembly 138 that controls the position, movement, and orientation of the clamping assembly 136. The illustrated positioning assembly 138 includes an upper positioning assembly 139 that is associated with the upper end of the clamping assembly 136 and a lower positioning assembly 140 that is associated with the lower end of the clamping assembly 136.

Upper Positioning Assembly

Referring to FIGS. 5, 6, and 8, the upper positioning assembly 139 includes a presser foot 141 that is connected to the upper block 114 by a presser foot cylinder 142. The presser foot cylinder 142 is hingedly connected to the upper block 114. Extending and retracting the presser foot cylinder 142 moves the presser foot 141. Referring to FIGS. 5, 6, and 9, the presser foot 141 is directed along a path 144 by ratcheting cams 146 that are housed in the inner walls of the arms 112, 113. The presser foot includes protrusions 147 that follow the surface of the cams 146. The ratcheting cams 146 are biased to rotate in a direction that is opposite the direction that the presser foot 141 moves along the path 144. The rotational bias of the ratcheting cam 146 is represented by compression spring 145 although rotational springs, other biasing mechanisms, and other configurations can be used. The structure of the arms 112, 113 limits the rotation of the ratcheting cams 146 in either direction.

Referring to FIGS. 9-12, the extension and contraction of the presser foot cylinder 142 and the contact between the protrusions 147 and the path defining surface of the ratcheting cams 146 moves the presser foot 141 along the cam path 144. As the presser foot 141 moves along segments of the path 144, the protrusion 147 contacts and rotates the ratcheting cams 146 (see FIG. 11). As the protrusion 147 continues along the path 144, the protrusion 147 clears the ratcheting cam 146 and spring 145 rotates the ratcheting cams 146 to close the portion of the path 144 that the protrusion 147 just traveled along. The protrusion 147 is directed along the next segment of the path 144 by the ratcheting cams 146 when the presser foot cylinder 142 retracts or reverses direction. FIGS. 10-12 illustrate the movement of the protrusion 147 along the path 144 and the operation of the cam 146 as the presser foot cylinder 142 extends. The function of the cam 146 and the protrusion 147 is substantially the same as the presser foot cylinder 142 is retracted from the position illustrated in FIG. 12.

Referring to FIGS. 5 and 8, the presser foot 141 includes a base 148 and an outer shell 150 that are pivotably connected to one another. The base 148 is attached to the lower end of the presser foot cylinder 142. A compression spring 152 biases the outer shell 150 forward.

Referring to FIG. 8, the presser foot 141 is configured to receive and engage the plunger boss 58. The illustrated presser foot 141 includes a pair of fingers 154 that extend outwardly and are configured to receive the dry tube assembly 16 therebetween. The spacing between the fingers 154 is greater than the diameter of the illustrated plunger 50 and less than the diameter of the plunger boss 58 such that the presser foot 141 can move along a length of the dry tube assembly 16 with the plunger 50 between the fingers 154 and the fingers 154 can contact and engage the plunger boss 58. The fingers 154 are biased slightly downward by the spring 152. The spring-biased fingers 154 provide a visual indication of when the boss 58 is in contact with the fingers 154.

The bottoms of the fingers 154 include a pocket 156 for receiving the plunger boss 58. The illustrated pocket 156 is configured to engage the plunger boss 58. The pocket includes a lip 158 for capturing the plunger boss 58 as the presser foot 141 moves outwardly and upwardly along a lower portion of the path 144. The downward bias of the fingers 154 facilitates capturing the boss 58 as the downward angle of the fingers 154 permits the lip 158 to slide or drop over the boss 58. Alternatively described, the downward bias of the fingers 154 facilitates guiding the boss 58 into the pocket 156.

The illustrated presser foot 141 includes sensors 160 that are configured to identify when the plunger boss 58 is received in the pocket 156. As the plunger boss 58 is received in the pocket 156, the outer shell 150 is rotated to compress the spring 152. The illustrated sensors 160 identify when the outer shell 150 is rotated with respect to the base 148 as the sensor 160 on the base 148 is in contact with or in proximity to the sensor 160 on the outer shell 150. Other configurations and types of sensors 160 can be used to identify when the plunger boss 58 is received in the pocket 156 or otherwise when the apparatus 100 is positioned to engage the dry tube assembly 16 as described in further detail below.

Clamping Assembly

Referring again to FIGS. 5 and 6, a clamping assembly 136 that is configured to engage and encapsulate the dry tube assembly 16 includes clamp jaws 172 (see FIGS. 14 and 15) that are supported and positioned by a plate 174. The upper end of the plate 174 is hingedly connected to the presser foot 141 to connect the clamping assembly 136 to the upper positioning assembly 139. The clamp jaws 172 are controlled by clamp cylinders 176.

Referring to FIGS. 13-15, the clamping assembly 136 is configured to apply an encapsulation sleeve 180 to the dry tube assembly 16. The illustrated encapsulation sleeve 180 includes a pair of halves 182, 183 that are configured to be secured to one another. The illustrated halves 182, 183 each include ridges 184 that are configured to engage one another when the halves 182, 183 are combined. The halves 182, 183 can be combined around dry tube assemblies of various diameters. In addition, the halves 182, 183 are connected with a living hinge 186 that includes strips 188 defined by apertures and notches to facilitate attaching the encapsulation sleeve 180 to and removing the encapsulation sleeve 180 from the clamping assembly 136.

The encapsulation sleeve 180 is configured to be attached to the clamping assembly 136 such that the clamp jaws 172 can close or wrap the encapsulation sleeve 180 around the dry tube assembly 16 as the clamp jaws 172 engage the dry tube assembly 16. The encapsulation sleeve 180 is configured to be wrapped around the dry tube assembly 16 to encapsulate the joint 44 and prevent debris from falling into the pressure vessel 10. Referring to FIG. 14, the clamping assembly 136 includes a hook 189 and the encapsulation sleeve 180 is attached to the clamping assembly 136 as a strip 188 wraps around the hook 189. Further, referring to FIGS. 14 and 15, the clamping assembly 136 includes a cutting mechanism 185 that cuts the strip 188 as the clamp jaws 172 wrap the encapsulation sleeve 180 around the dry tube assembly 16. Once the strips 188 are cut, the encapsulated dry tube assembly 16 can be released by the clamping assembly 136 as the clamp jaws 172 are opened. Once the strips 188 are cut, the strips 188 do not hold the encapsulation sleeve 180 on the hook 189.

Lower Positioning Assembly

Referring again to FIGS. 5 and 6, the lower end of the clamping assembly 136 is coupled to the lower positioning assembly 140. The lower end of the clamping assembly 136 includes protrusions 178 that are configured to follow a cam track. The lower positioning assembly 140 includes displaceable cam plates 190 and cam plate cylinders 192 that are housed in the lower block 116. The cam plates 190 each include a cam track 194 that receives one of the protrusions 178. The cam plate cylinders 192 can move the cam plates 190 to move the protrusions 178 along the cam tracks 194. The illustrated cam plates 190 are configured to be displaced in a substantially vertical direction and the illustrated cam tracks 194 include substantially vertical segments 195, 196 that are offset from one another and a medial diagonal segment 197 that connects the vertical segments 195, 196.

The illustrated positioning apparatus provides that movement, positioning, and orientation of the clamping assembly 136 can be achieved by operating either or each of the presser foot cylinder 142 and the cam plate cylinders 192. In general, the presser foot cylinder 142 controls the vertical movement of the clamping assembly 136. The connection between the clamping assembly 136 and the cam plates 190 permits the clamping assembly 136 to move vertically with the presser foot 141 without synching the movement with the cam plate cylinders 192. The rotation of the clamping assembly 136 is a function of the extension of the presser foot cylinder 142 and the extension of the cam plate cylinders 192.

The rotation of the clamping assembly 136 can be controlled by operating the presser foot cylinder 142. For example, the presser foot cylinder 142 can be operated to move the upper end of the clamping assembly 136 along a path that is substantially similar to the cam path 144 while the lower end of the clamping assembly 136 moves along a vertical segment 195, 196 of the cam track 194. Alternatively, the rotation of the clamping assembly 136 can be controlled by operating the cam plate cylinders 192. For example, the position of the upper end of the clamping assembly 136 can be maintained while the cam plate cylinders 192 are operated to move the lower end of the clamping assembly 136 as the protrusions 178 move along the medial segment 197 of the cam track 194.

The illustrated apparatus 100 is configured such that operation of the presser foot cylinder 142 moves the clamping assembly 136 into position to engage and encapsulate the dry tube assembly 16, such that subsequent operation of the cam plate cylinders 192 moves the clamping assembly 136 to initiate buckling of the dry tube assembly 16, and such that subsequent operation of the presser foot cylinder 142 continues to buckle the dry tube assembly 16 and removes the dry tube assembly 16 from engagement with the top guide 12. An exemplary method of operation of the apparatus 100 is now described in further detail.

Method of Operation

An exemplary method of operating the apparatus 100 is now described although the apparatus 100 can be operated according to other methods. For example, the described exemplary method can be modified by adding or omitting steps, rearranging the order of the steps, combinations thereof and the like.

Referring to FIG. 4, the fuel bundles 20 surrounding the dry tube assembly 16 are removed such that the apparatus 100 can be positioned adjacent to the dry tube assembly 16 and such that the apparatus 100 has room to operate without being obstructed by or damaging fuel bundles 20, control rods 22, control rod blades 26, or any other element of the pressure vessel 10. The profile of the apparatus 100 minimizes the number of fuel bundles 20 that must be removed during service. The apparatus 100 occupies and operates in approximately the space of a single fuel bundle 20.

Before mounting the apparatus 100 to the top guide 12, the encapsulation sleeve 180 is attached to the clamping assembly 136 as described above. Referring to FIGS. 4 and 7, the apparatus 100 is then lowered through the appropriate fuel bundle space 24 and mounted to the intersection 32 of the top guide 12. The teeth 134 of the slide 130 are fuel bundle spaces 24 that are diagonally positioned with respect to one another. The teeth 134 are configured to closely position the apparatus 100 with respect to the intersection 32 and the weight of the apparatus 100 pulls the apparatus 100 against the intersection 32. The cables 122 are then tightened to pull the ledges 118 into contact with the bottom of the top guide 12 to secure or mount the apparatus 100 to the top guide 12. This mechanism permits the apparatus 100 to accommodate a range of top guide heights without reconfiguring the apparatus 100 since the apparatus 100 registers against the bottom of the top guide 12. The illustrated mounting mechanism consistently positions the apparatus 100 with respect to the bottom of the top guide 12.

Referring to FIGS. 16-19, as the ledge 118 is positioned against the bottom of the top guide 12, the apparatus 100 is mounted to the top guide 12 and positioned with respect to the dry tube assembly 16 so as to be able to operate to remove the dry tube assembly 16. The operation of the apparatus 100 is generally accomplished through operation of the cylinders. Through operation of the cylinders, the apparatus 100 functions to engage, encapsulate, buckle, and remove the dry tube assembly 16 from engagement with the top guide 12.

Referring to FIGS. 16 and 17, the presser foot cylinder 142 is actuated and extends to move the presser foot 141 along the cam path 144 toward the dry tube assembly 16 until the plunger 50 is received between the fingers 154. The presser foot 141 then continues down along the length of the plunger 50 until the plunger boss 58 is received in the pocket 156. The sensors 160 or operator vision can be used to recognize that the plunger boss 58 is received in the pocket 156. In various embodiments, the sensors 160 provide an output or indicator to a display to alert an operator that the clamping assembly 136 is in position to engage the dry tube assembly 16. Alternatively, the sensors 160 can output machine readable instructions that cease the extension of the presser foot cylinder 142. In either case, operation of the presser foot cylinder 142 is momentarily stopped such that the presser foot 141 does not substantially press down on the plunger boss 58 or otherwise exercise the joint 44.

The clamping assembly 136 moves with the presser foot 141 toward and down the dry tube assembly 16 and positions the encapsulation sleeve 180 and the clamp jaws 172 proximate the dry tube assembly 16. The clamping assembly 136 is positioned such that the clamp jaws 172 engage the dry tube assembly 16 above and below the joint 44 The length of the dry tube assembly 16 between the clamp jaws 172 is a supported length 200 and the length of the dry tube assembly below the lower clamp jaw 172 is an unsupported length 202. The supported length 200 is supported to support the joint 44 as the unsupported length 202 is buckled.

Referring to FIGS. 14, 15, and 17, the clamp cylinders 176 are actuated to encapsulate the joint 44 with the encapsulation sleeve 180 and to engage the dry tube assembly 16 with the clamp jaws 172.

Referring to FIG. 18, the cam plate cylinders 192 are then actuated to initiate buckling of the dry tube assembly 16. As the cam plate cylinders 192 are actuated and extend, the protrusions 178 move through the diagonal segments 197 of the cam tracks 194 and the clamping assembly 136 rotates about the hinged connection to the presser foot 141. As the clamping assembly 136 rotates, the length of the dry tube assembly 16 that is engaged by the clamp jaws 172 is displaced along with the clamping assembly 136 and the dry tube assembly 16 is buckled or buckling is initiated along the unsupported length 202.

Referring to FIGS. 11, 12, and 19, once buckling has been initiated, the dry tube assembly 16 continues to buckle along the unsupported length 202 as the presser foot cylinder 142 is again actuated and extended. The presser foot 141 and the clamping assembly 136 both move downward as the presser foot 141 continues along the downward segment of the cam path 144. The dry tube assembly 16 continues to buckle along the unsupported length 202 and the end 52 of the dry tube assembly is removed from the recess 30 without exercising the joint 44 or otherwise buckling the dry tube assembly 16 along the supported length 200. Since the presser foot 141 and the clamping assembly 136 move substantially as a unit, a force is not applied to the plunger 50 as the presser foot 141 moves downward.

Referring to FIGS. 12 and 19, once the presser foot 141 reaches the lowermost point of the cam path 144 or otherwise clears the guidance provided by the ratcheting cam 146 as the presser foot cylinder 142 extends, the presser foot cylinder 142 can be actuated to retract and move the dry tube assembly 16 away from the intersection 32 and upward as the presser foot 141 moves along the cam path 144. The apparatus 100 can then be removed along with the engaged dry tube assembly 16 by lifting the apparatus 100 through the fuel bundle space 24 with the hoist cables 122.

The embodiments have been illustrated in a manner that is intended in all respects to be illustrative rather than restrictive. Those skilled in the art will recognize that many modifications and variations are possible without departing from the scope of the teachings. For example, as used herein, directional references such as top, base, bottom, end, side, inner, outer, upper, middle, lower, front, and rear do not limit the respective elements to such orientation, but merely serve to distinguish these elements from one another.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims or if they include equivalent structural elements with insubstantial differences from the literal language of the claims.

What is claimed is:

1. An apparatus for removing a dry tube assembly in a reactor vessel, comprising:
   a clamping assembly configured to engage a dry tube assembly;
   an upper positioning assembly, wherein the clamping assembly is hingedly connected to the upper positioning assembly; and
   a lower positioning assembly that is configured to rotate the clamping assembly about the hinged connection, the hinged connection having an axis that is substantially perpendicular to a longitudinal axis of a dry tube assembly when the clamping assembly is positioned to engage a dry tube assembly,
   wherein the clamping assembly is configured to rotate to initiate buckling of a dry tube assembly that is engaged by the clamping assembly.

2. The apparatus of claim 1, further comprising a mounting structure configured to mount the apparatus to a top guide.

3. The apparatus of claim 2, the mounting structure being configured to register against the bottom of a top guide.

4. The apparatus of claim 2, the mounting structure comprising a frame and a slide, the slide being configured to travel along a length of the frame.

5. The apparatus of claim 1, the upper positioning assembly comprising a presser foot that is configured to position the clamping assembly relative to a dry tube assembly, the clamping assembly being hingedly connected to the presser foot.

6. The apparatus of claim 5, the upper positioning assembly comprising a ratcheting cam that is configured to guide the presser foot along a predefined path.

7. The apparatus of claim 5, the lower positioning assembly comprising a cam track and a cam track follower that couples the clamping assembly to the cam track, the cam track being configured such that the clamping assembly is rotated about the hinged connection as a function of the position of the cam track follower along the cam track.

8. The apparatus of claim 1, the upper positioning assembly comprising a presser foot comprising a pocket and a lip that are configured to capture a boss of a dry tube assembly.

9. The apparatus of claim 1, the upper positioning assembly comprising presser foot that is configured to rotate in response to contact with a boss of a dry tube assembly.

10. The apparatus of claim 1, the lower positioning assembly comprising a cam track and a cam track follower that couples the clamping assembly to the cam track.

11. The apparatus of claim 10, the lower positioning assembly comprising a cylinder that is configured to position the cam track follower along the cam track, wherein the cam track is configured such that the clamping assembly is rotated about the hinged connection as a function of the position of the cam track follower along the cam track.

12. The apparatus of claim 1, the clamping assembly being configured to apply an encapsulation sleeve to a dry tube assembly and to release the encapsulation sleeve as it is applied.

13. The apparatus of claim 12, wherein the clamping assembly includes a cutting mechanism that is configured to cut a hinge that connects two halves of an encapsulation sleeve.

14. The apparatus of claim 1, wherein the upper positioning assembly is configured position the clamping assembly relative to a joint of the dry tube assembly.

15. The apparatus of claim 14, wherein the clamping assembly is configured to engage the dry tube assembly above and below the joint.

16. The apparatus of claim 1, wherein the clamping assembly is configured to encapsulate a length of the dry tube assembly.

17. The apparatus of claim 1, wherein the upper positioning assembly is further configured to apply an axial load to the dry tube assembly.

18. The apparatus of claim 1, further comprising a mounting structure that is configured to position the apparatus so as to be adjacent to the dry tube assembly.

19. The apparatus of claim 18, wherein the clamping assembly is coupled to the lower positioning assembly by a cam track and a cam track follower, wherein the cam track is configured such that the clamping assembly is rotated about the hinged connection as a function of the position of the cam track follower along the cam track.

20. The apparatus of claim 1, the upper positioning assembly comprising a cylinder.

* * * * *